US006523566B2

(12) United States Patent
Wynn, Jr.

(10) Patent No.: US 6,523,566 B2
(45) Date of Patent: Feb. 25, 2003

(54) FILTER FOR PRESSURE REGULATOR

(75) Inventor: James A. Wynn, Jr., Virginia Beach, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 104 days.

(21) Appl. No.: 09/729,717

(22) Filed: Dec. 6, 2000

(65) Prior Publication Data

US 2001/0029928 A1 Oct. 18, 2001

Related U.S. Application Data

(60) Provisional application No. 60/168,744, filed on Dec. 6, 1999.

(51) Int. Cl.[7] ................................................ F16K 31/12

(52) U.S. Cl. ....................... 137/550; 137/508; 123/457; 123/463; 123/510

(58) Field of Search ................................ 123/510, 445, 123/457, 514, 463, 415; 137/550, 508, 549

(56) References Cited

U.S. PATENT DOCUMENTS

| | | | | | |
|---|---|---|---|---|---|
| 4,310,142 | A | * | 1/1982 | Ludwig | 137/549 |
| 5,078,167 | A | * | 1/1992 | Brandt et al. | 137/549 |
| 5,413,077 | A | * | 5/1995 | Hornby et al. | 123/457 |
| 5,509,444 | A | * | 4/1996 | Robinson et al. | 137/508 |
| 6,098,652 | A | * | 8/2000 | Brandt | 137/315.05 |
| 6,213,143 | B1 | * | 4/2001 | Schwegler et al. | 137/115.27 |
| 6,334,460 | B1 | * | 1/2002 | Hem | 137/508 |

* cited by examiner

*Primary Examiner*—A. Michael Chambers

(57) ABSTRACT

An internal fuel filter for a pressure regulator having a body that encloses a fuel flow path. A first support includes a first surface adapted to be sealingly surrounded by the body. A second support is spaced from the first support along an axis. At least one rib is disposed between and contiguous with the first and second supports, wherein one of the rib and the second support includes a second surface adapted to sealingly surrounded the body. A filter element extends between the first support and the second support and surrounds the axis.

24 Claims, 5 Drawing Sheets

FILTER FOR PRESSURE REGULATOR

CROSS REFERENCE TO CO-PENDING APPLICATION

This application claims the benefit of the earlier filing date of U.S. Provisional Application No. 60/168,744, filed Dec. 6, 1999, the disclosure of which is incorporated by reference herein in its entirety.

FIELD OF THE INVENTION

A filter for a fuel pressure regulator for automotive fuel systems, and more particularly to a filter that is mounted internal to the pressure regulator housing.

BACKGROUND OF THE INVENTION

It is believed that most modern automotive fuel systems utilize fuel injectors to deliver fuel to the engine cylinders for combustion. It is believed that these fuel injectors are connected to a fuel rail to which fuel is supplied by a pump. It is also believed that the pressure at which the fuel is supplied to the fuel rail must be regulated to ensure the proper operation of the fuel injectors. It is believed that such regulating is carried out using pressure regulators that control the pressure of the fuel in the system at all engine speeds, i.e., as measured in revolutions per minute.

It is believed that conventional fuel pressure regulators include the flow-through type and non-flow-through type as disclosed in commonly-assigned U.S. Pat. No. 5,509,444 to Robinson et al. and U.S. Pat. No. 5,413,077 to Hornby et al., respectively, which are incorporated herein in their entirety by reference.

It is believed to be necessary to filter the fuel flowing through the pressure regulators to remove impurities and ensure proper operation of the components on the fuel rail, such as the fuel injectors. To achieve this purpose, it is believed that filters have been mounted on an external surface of pressure regulators, and that these external filters are subject to damage and accidental removal during assembly, testing, handling, and installation into a vehicle. It is also believed that filters have been mounted internal to the pressure regulator, and that these internal filters are protected from inadvertent damage and removal, but provide a limited filter area that has proven to be inadequate. It is believed that a fuel filter is needed that is protected from damage and provides a sufficiently large filtration area.

SUMMARY OF THE INVENTION

The present invention provides an internal fuel filter for a pressure regulator that has a body that encloses a fuel flow path. The filter comprises a first support that includes a first surface adapted to be sealingly surrounded by the body, a second support that is spaced from the first support along an axis, at least one rib that is disposed between and contiguous with the first and second supports, and a filter element that extends between the first support and the second support and surrounds the axis. The at least one rib and the second support include a second surface adapted to sealingly surrounded the body.

The present invention also provides an internal fuel filter for a pressure regulator that has a body that encloses a fuel flow path. The filter comprises a first support that includes a first surface adapted to be sealingly surrounded by the body, a second support that is spaced from the first support along an axis and includes a second surface adapted to sealingly surrounded the body, at least one rib that is disposed between and contiguous with the first and second supports, and a filter element that extends between the first support and the second support and surrounds the axis.

The present invention further provides an internal fuel filter for a pressure regulator that has a body that encloses a fuel flow path. The filter comprises a first support that includes a first surface adapted to be sealingly surrounded by the body, a second support that is spaced from the first support along an axis, at least one rib that is disposed between and contiguous with the first and second supports, and a filter element extends between the first support and the second support and surrounds the axis. The at least one rib includes a second surface adapted to sealingly surrounded the body.

BRIEF DESCRIPTION OF THE DRAWINGS

The accompanying drawings, which are incorporated herein and constitute part of this specification, illustrate presently preferred embodiments of the invention and, together with the general description given above and the detailed description given below, serve to explain features of the invention.

DETAILED DESCRIPTION OF THE PREFERRED EMBODIMENT

Figure 1B:
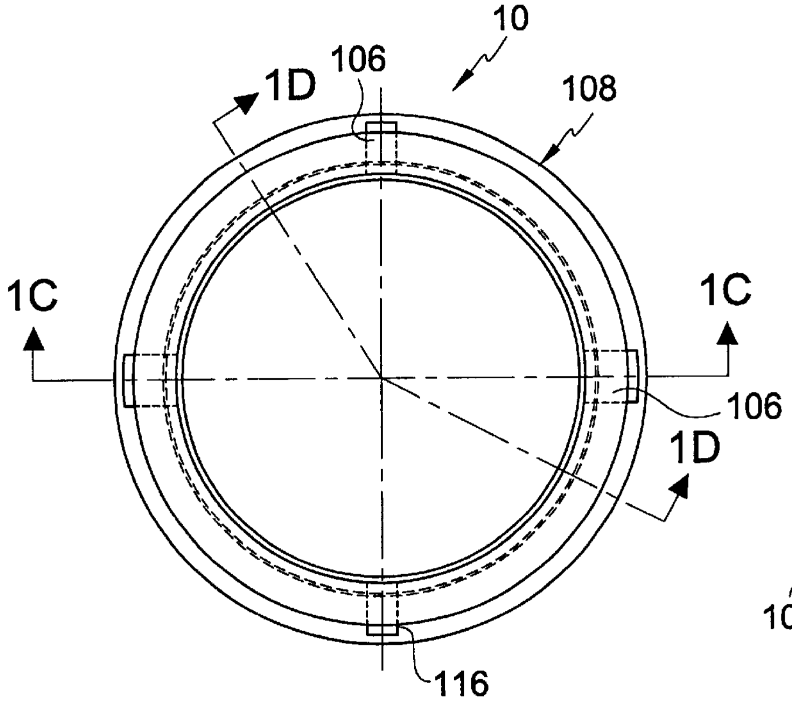
FIG. 1B is a top view of the fuel filter shown in FIG. 1A.
Figure 1A:
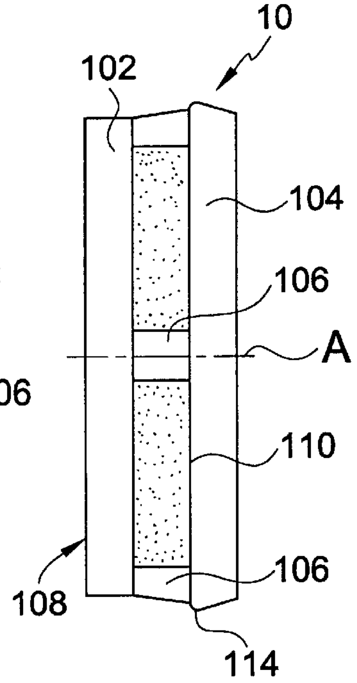
FIG. 1A is a side view of a fuel filter according to a first embodiment of the present invention.
Figure 1C:
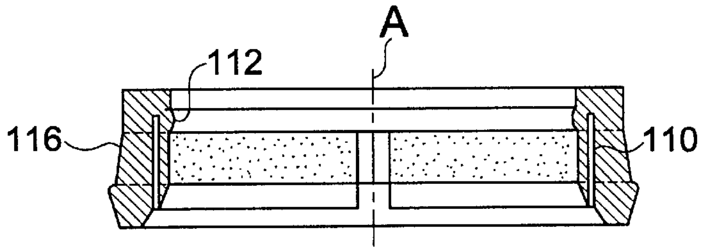
FIG. 1C is a cross-sectional view of the fuel filter shown in FIG. 1A, the cross-section being taken along line 1C—1C in FIG. 1B.
Figure 1D:
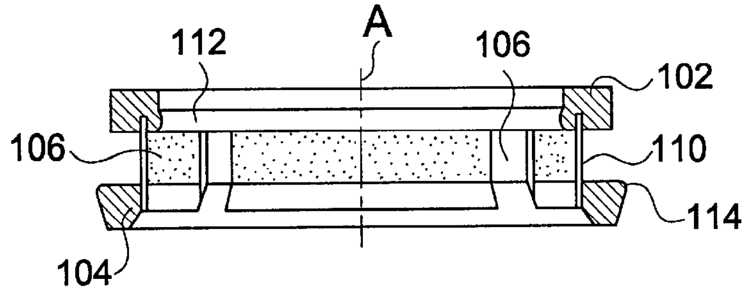
FIG. 1D is a cross-sectional view of the fuel filter shown in FIG. 1A, the cross-section being taken along line 1D—1D in FIG. 1B.
Figure 2B:
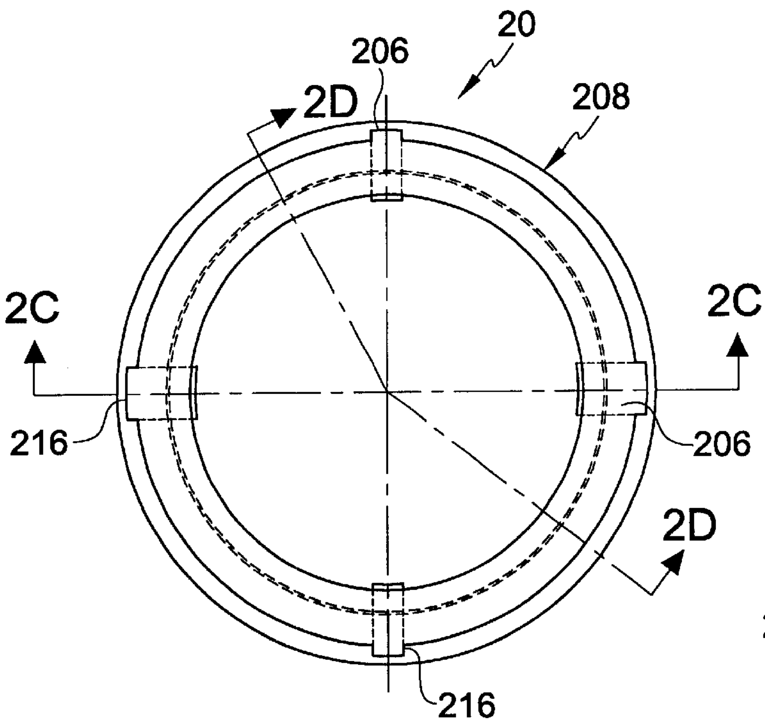
FIG. 2B is a top view of the fuel filter shown in FIG. 2A.
Figure 2A:
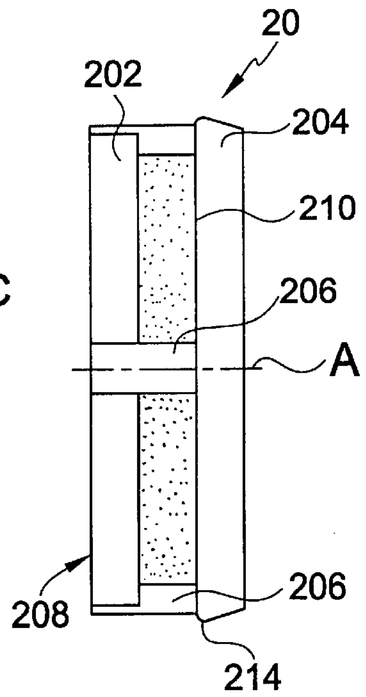
FIG. 2A is a side view of a fuel filter according to a second embodiment of the present invention.
Figure 2C:
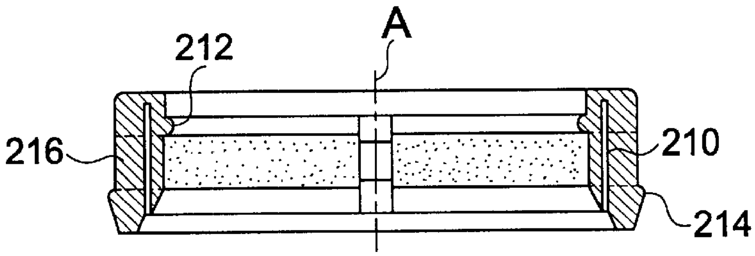
FIG. 2C is a cross-sectional view of the fuel filter shown in FIG. 2A, the cross-section being taken along line 2C—2C in FIG. 2B.
Figure 2D:
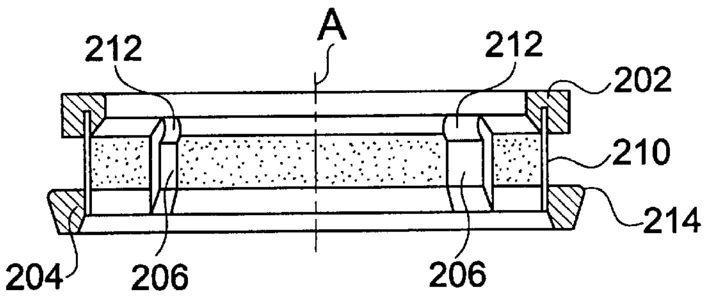
FIG. 2D is a cross-sectional view of the fuel filter shown in FIG. 2A, the cross-section being taken along line 2D—2D in FIG. 2B.
Figure 3B:
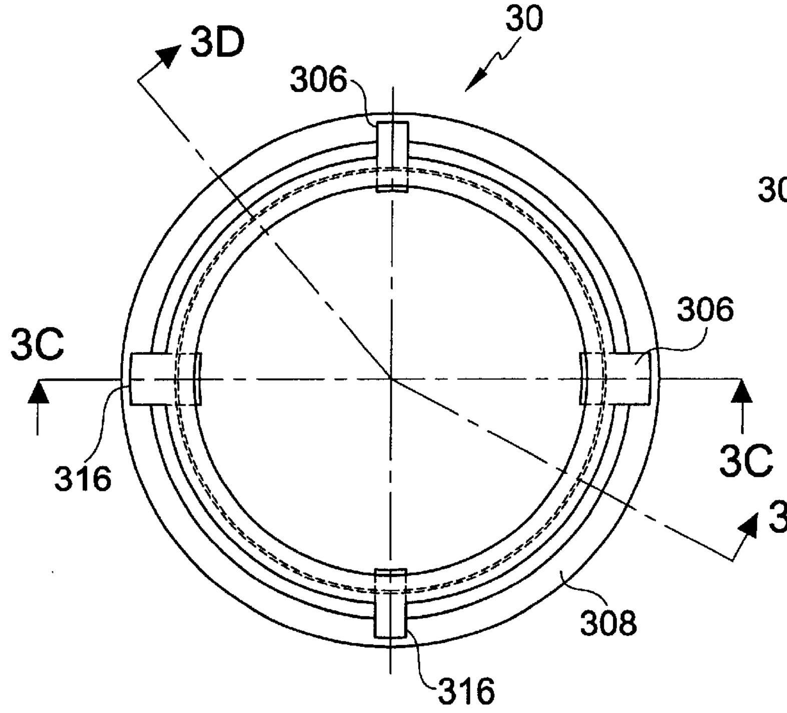
FIG. 3B is a top view of the fuel filter shown in FIG. 3A.
Figure 3A:
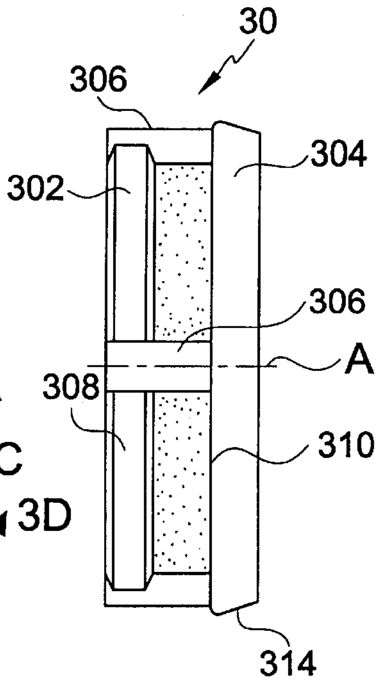
FIG. 3A is a side view of a fuel filter according to a third embodiment of the present invention.
Figure 3C:
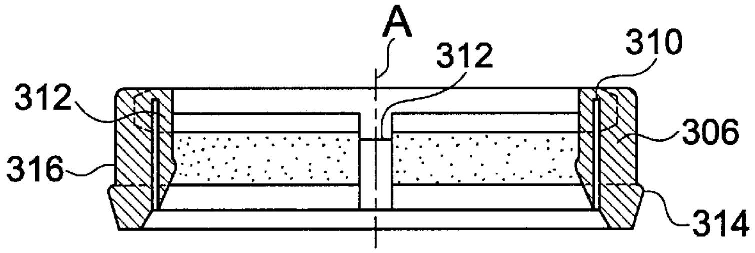
FIG. 3C is a cross-sectional view of the fuel filter shown in FIG. 2A, the cross-section being taken along line 3C—3C in FIG. 3B.
Figure 3D:
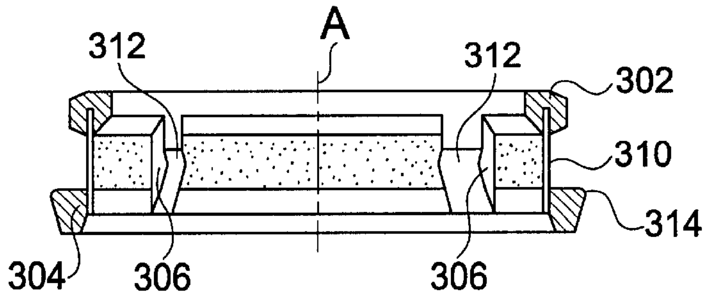
FIG. 3D is a cross-sectional view of the fuel filter shown in FIG. 2A, the cross-section being taken along line 3D—3D in FIG. 3B.

A first embodiment of the fuel filter of the present invention will be described with reference to FIGS. 1A–1D. As shown, the filter 10 has a first support 102 and a second support 104 offset along a filter axis A. The first and second supports 102,104 are connected with ribs 106 to define a filter frame 108. A filter element 110 is attached to the frame 108 such that it surrounds the axis A, forming a generally cylindrical filter assembly. The frame 108 is substantially fluid-impermeable and the filter element 110 is substantially fluid-permeable.

The first and second supports 102,104 can be annular. The first support 102 has a protrusion 112 on a portion of an inner circumference that can engage a first internal surface of a fuel pressure regulator. The protrusion 112 can extend along the entire inner circumference of the first support 102, or can extend along a length of the first support 102 that is contiguous with the ribs 106. The second support 104 has a sealing surface 114 on an outer circumference that can engage a second internal surface of a fuel pressure regulator. The protrusion 112 and sealing surface 114 create a flow path through at least a portion of the filter element 110 that is substantially perpendicular to the axis A.

The supports 102,104 and ribs 106 can be made of a thermoplastic material, although other materials are considered to be within the scope of the invention. The filter element 110 can be a woven filter material that is insert molded into the frame 108 using a conventional process, thereby sealing the filter element 110 within the supports 102,104 and ribs 106. The filter element 110 can be made from a single piece extending over the entire frame circumference, or from multiple pieces extending over a circumferential portion of the frame 108. When multiple pieces are used, the ends can overlap before the insert molding process. One or more of the ribs 106 can have an increased circumferential dimension to accommodate overlapping ends of the filter material. The ribs 106 have an outer surface 116 oriented obliquely with respect to the filter axis A. The orientation of the outer surfaces 116 can aid in the removal of the filter element 110 from a mold during manufacture.

An alternative filter embodiment 20 is shown in FIGS. 2A–2D. This embodiment has elements comparable to the first embodiment 10, including a first support 202 and a second support 204 connected with ribs 206 to define a filter. frame 208, and a filter element 210 attached to the frame 208 such that it surrounds the axis A. The first support 202 has a protrusion 212 on a portion of an inner circumference that can engage a first internal surface of a fuel pressure regulator. The protrusion 212 can extend along the entire inner circumference of the first support 202, or can extend along a length of the first support 202 contiguous with the ribs 206. The second support 204 has a sealing surface 214 on an outer circumference that can engage a second internal surface of a fuel pressure regulator. The protrusion 212 and sealing surface 214 create a flow path through at least a portion of the filter element 210 that is substantially perpendicular to the axis A. The ribs 206 have an outer surface 216 that is oriented substantially parallel to the filter axis A. The orientation of the surfaces 216 can result in a lower mold manufacturing cost, since the fuel filter 20 is relatively geometrically simple.

Another alternative filter embodiment 30 is shown in FIGS. 3A–3D. This embodiment has elements comparable to the other embodiments 10,20, including a first support 302 and a second support 304 connected with ribs 306 to define a filter frame 308, and a filter element 310 attached to the frame 308 such that it surrounds the axis A. At least one rib has a protrusion 312 on a portion of an inner circumference that can engage a first internal surface of a fuel pressure regulator. The protrusion 312 can extend along the entire inner circumference of the at least one rib 306, or can extend along a portion of a length of the at least one rib 306. Further, protrusions can be disposed on each of the ribs 306. The second support 304 has a sealing surface 314 on an outer circumference that can engage a second internal surface of a fuel pressure regulator. The protrusion 312 and sealing surface 314 create a flow path through at least a portion of the filter element 310 that is substantially perpendicular to the axis A. The ribs 306 have an outer surface 316 that is oriented substantially parallel to the filter axis A. The orientation of the outer surfaces 316 can result in a lower mold manufacturing cost, thereby decreasing the cost of the fuel filter 30.

Figure 4:
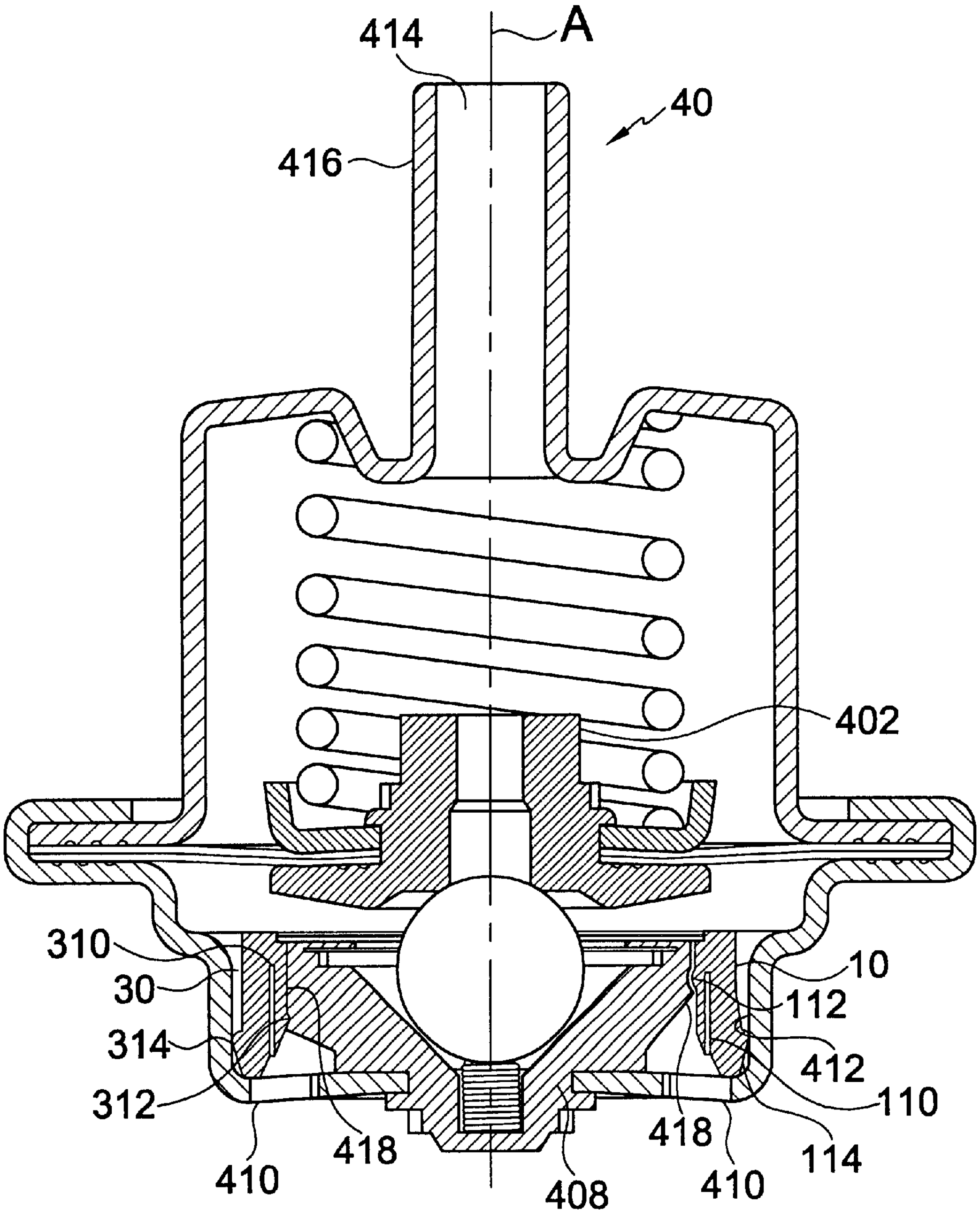
FIG. 4 is a cross-sectional view of a flow-through fuel pressure regulator with the fuel filter according to the third embodiment shown on the left side and the fuel filter according to the first embodiment shown on the right side.

FIG. 4 shows examples of fuel filters according to the present invention installed in a flow-through fuel pressure regulator 40. Fuel filters 10 and 30 are shown for illustrative purposes, although it is understood that a single filter 10, 20, or 30 would be used at any given time. Further, fuel filter 20 would be installed in a similar manner.

As shown, the protrusion 112 on the inner circumference of the first support 102 and the protrusions 312 on the inner circumference of the ribs 306, respectively, engage an indentation 418 on an outer surface of the valve actuator housing 408. The indentation 418 receives the protrusion or protrusions 112,312, and retains the filter 10,30 in place. The sealing surface 114,314 on the outer circumference of the second support 104,304 engages an inner surface of the regulator housing 412. The protrusion or protrusions 112, 312, and sealing surfaces 114,314, define a flow path through the filter 10,30. In operation, fuel enters the regulator 40 through the openings 410 in the lower housing 412, then passes through the filter element 110,310 in a substantially radial direction (away from axis A) before proceeding through the valve seat 402 and the opening 414 in the upper regulator housing 416.

Figure 5:
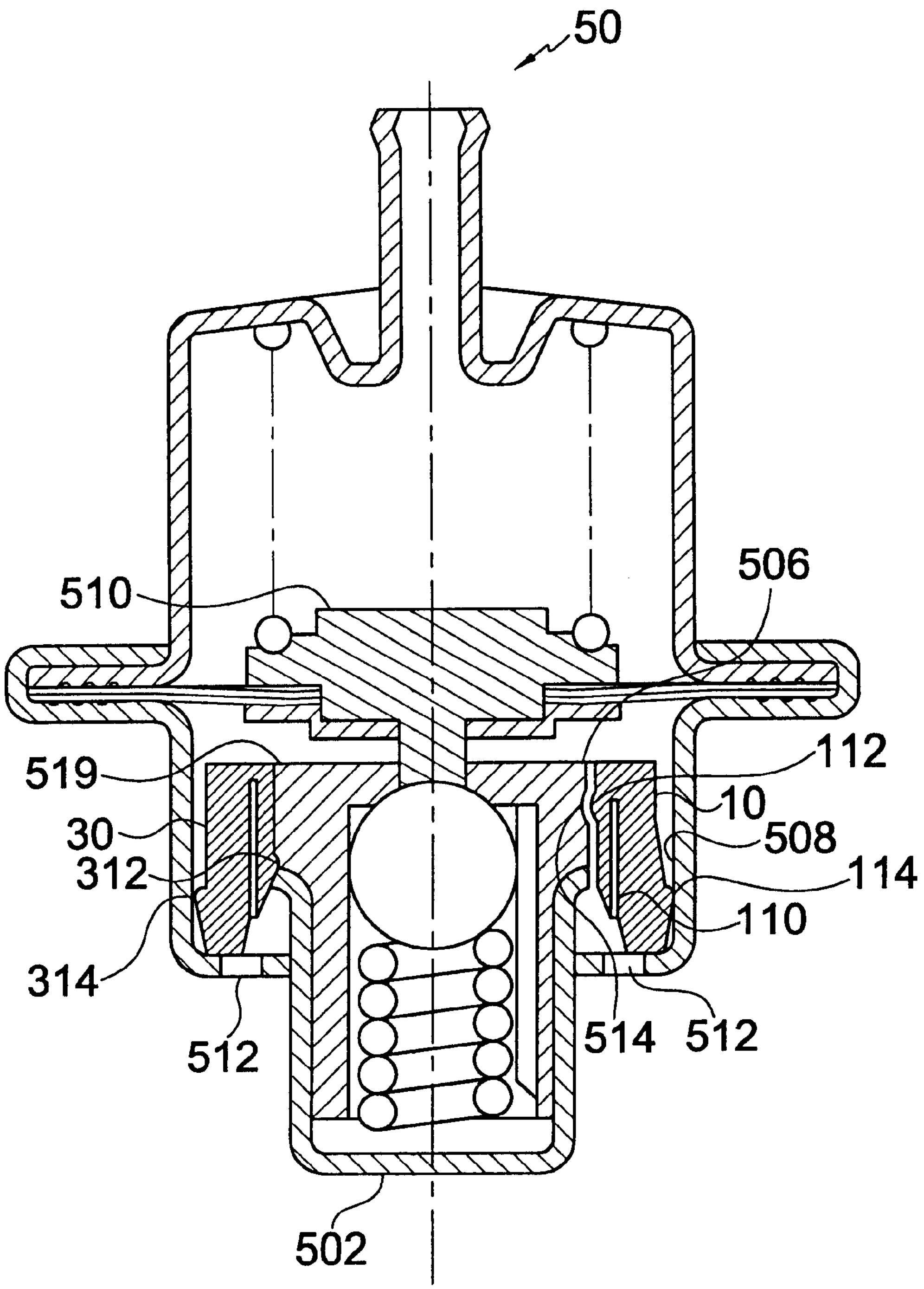
FIG. 5 is a cross-sectional view of a non-flow-through fuel pressure regulator with the fuel filter according to the third embodiment shown on the left side and the fuel filter according to the first embodiment shown on the right side.

FIG. 5 shows an example of the fuel filters of the present invention installed in a non-flow-through fuel pressure regulator 50. Fuel filters 10 and 30 are shown for illustrative purposes, although it is understood that a single filter 10, 20, or 30 would be used at any given time. Further, fuel filter 20 would be installed in a similar manner.

In regulator 50 the protrusion 112 on the inner circumference of the first support 102 and the protrusions 312 on the inner circumference of the ribs 306 of the filter 10,30, respectively, engage an indentation an indentation 514 on an outer surface of the valve body 506. The indentation 514 receives the protrusion or protrusions 112,312 and retains the filter 10,30 in place. The sealing surface 114,314 on the outer circumference of the second support 104,304 engages an inner surface of the regulator housing 508. The protrusion or protrusions 112,312, and sealing surfaces 114,314, define a flow path through the filter 10,30. In operation, fuel enters the valve body 506 through the opening 507 in its lower end, then passes through the valve seat 510 before passing through the filter element 110,310 in a substantially radial direction (towards axis A). The fuel then proceeds out of the regulator 50 through the openings 512 in the lower regulator housing 508.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. An internal fuel filter for a pressure regulator having a body that defines a fuel flow path, the filter comprising:

a first support including a first surface adapted to be sealingly surrounded by the body;

a second support spaced from the first support along an axis;

at least one rib disposed between and contiguous with the first and second supports, wherein one of the rib and the second support includes a second surface radially offset to first surface with respect to the axis and adapted to sealingly surround the body; and filter element extending between the first support and the second support and surrounding the axis.

2. The filter according to claim 1, wherein the second support includes the second surface.

3. The filter according to claim 1, wherein the rib includes the second surface.

4. The filter according to claim 1, wherein the first surface is disposed on an outer circumference of the first support.

5. The filter according to claim 4, wherein the second surface extends along a portion of an inner circumference of one of the rib and the second surface.

6. The filter according to claim 5, wherein the second surface extends along an entire inner circumference.

7. The filter according to claim 1, wherein the at least one rib comprises four ribs.

8. The filter according to claim 7, wherein the four ribs are disposed generally equiangularly about the axis.

9. The filter according to claim 1, wherein the first support is adapted to be surrounded by a regulator lower housing.

10. The filter according to claim 1, wherein the second support is adapted to surround a valve actuator housing.

11. The filter according to claim 1, wherein the second support is adapted to surround a valve body.

12. The filter according to claim 1, wherein fluid flows through a portion of the filter element in a direction substantially perpendicular to the axis.

13. An internal fuel filter for a pressure regulator having a body that defines a fuel flow path, the filter comprising:

a first support including a first surface adapted to be sealingly surrounded by the body;

a second support spaced from the first support along an axis and radially offset from the first surface with respect to the axis, the second support including a second surface adapted to sealingly surround the body;

at least one rib disposed between and contiguous with the first and second supports; and a filter element extending between the first support and the second support and surrounding the axis.

14. The filter according to claim 13, wherein the first surface is disposed on an outer circumference of the first support.

15. The filter according to claim 14, wherein the second surface extends along a portion of an inner circumference of the second surface.

16. The filter according to claim 15, wherein the second surface extends along an entire inner circumference of the second surface.

17. An internal fuel filter for a pressure regulator having a body that defines a fuel flow path, the filter comprising:

a first support including a first surface adapted to be sealingly surrounded by the body;

a second support spaced from the first support along an axis;

at least one rib disposed between and contiguous with the first and second supports, and including a second surface radially offset to the first surface with respect to the axis and adapted to sealingly surround the body; and a filter element extending between the first support and the second support and surrounding the axis.

18. The filter according to claim 17, wherein the first surface is disposed on an outer circumference of the first support.

19. The filter according to claim 18, wherein the second surface extends along a portion of an inner circumference of the rib.

20. The filter according to claim 19, wherein the second surface extends along an entire inner circumference of the rib.

21. A flow-through pressure regulator, comprising:

a body defining a fuel flow path between an inlet and an outlet along a longitudinal axis;

a closure member that permits or inhibits flow through the fuel flow path; and a filter including:

a first support including a first surface being surrounded by the body;

a second support being spaced from the first support along the longitudinal axis;

at least one rib disposed between and contiguous with the first and second supports, one of the rib and the second support includes a second surface radially offset to the first surface with respect to the longitudinal axis and surrounding the body; and a filter element extending between the first support and the second support and surrounding the longitudinal axis.

22. The pressure regulator of claim 21, wherein the body comprises a regulator lower housing surrounding the first surface.

23. The pressure regulator of claim 21, wherein the body comprises a valve actuator housing being surrounded by the second surface.

24. The pressure regulator of claim 23, wherein the valve actuator housing comprises a portion configured to receive the closure member.

* * * * *